June 7, 1966   Z. LEVINTON   3,254,491
FENDER FOR MARINE PIERS
Filed Dec. 11, 1962   4 Sheets-Sheet 1
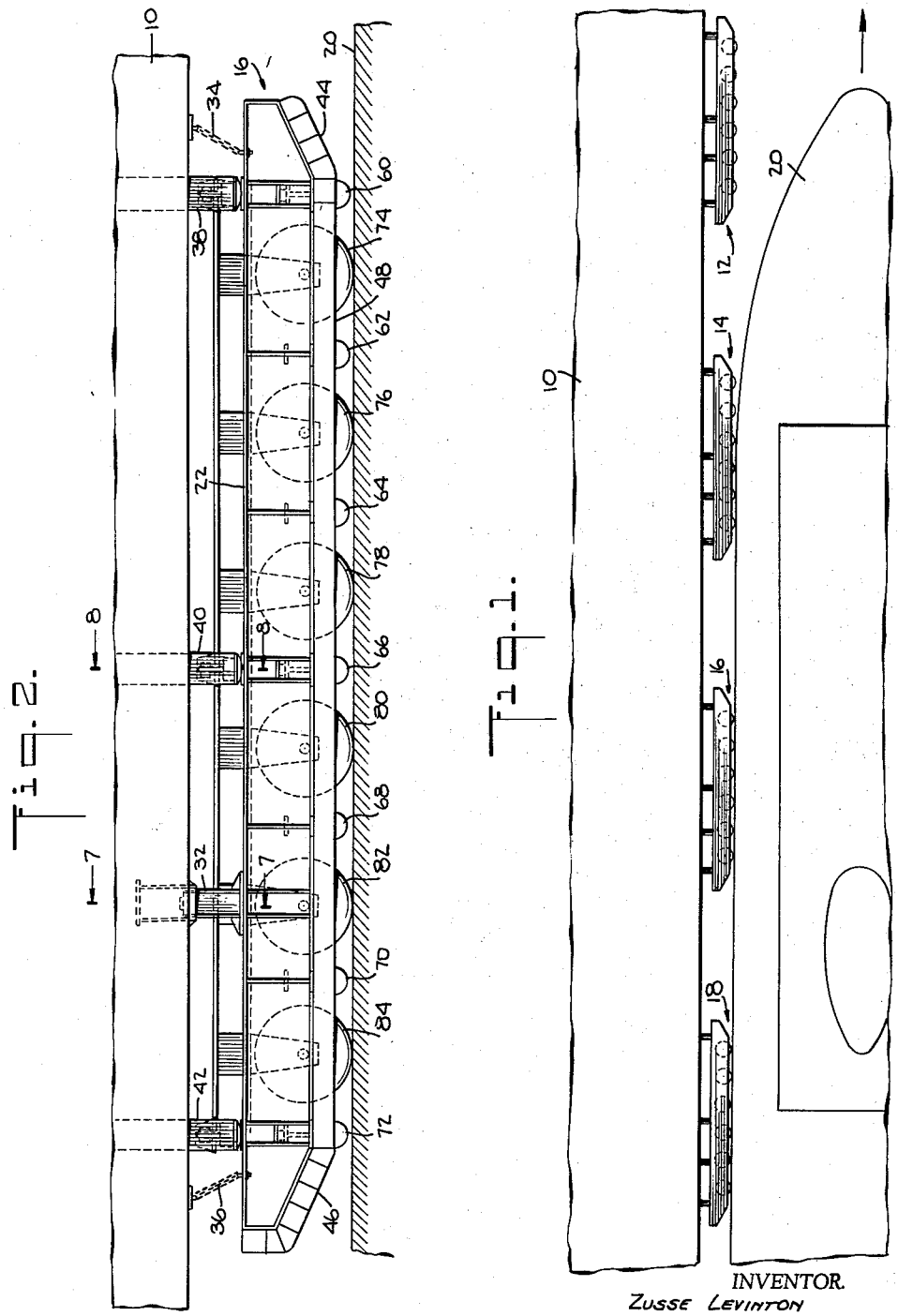
INVENTOR.
ZUSSE LEVINTON
BY
Kenyon & Kenyon
ATTORNEYS

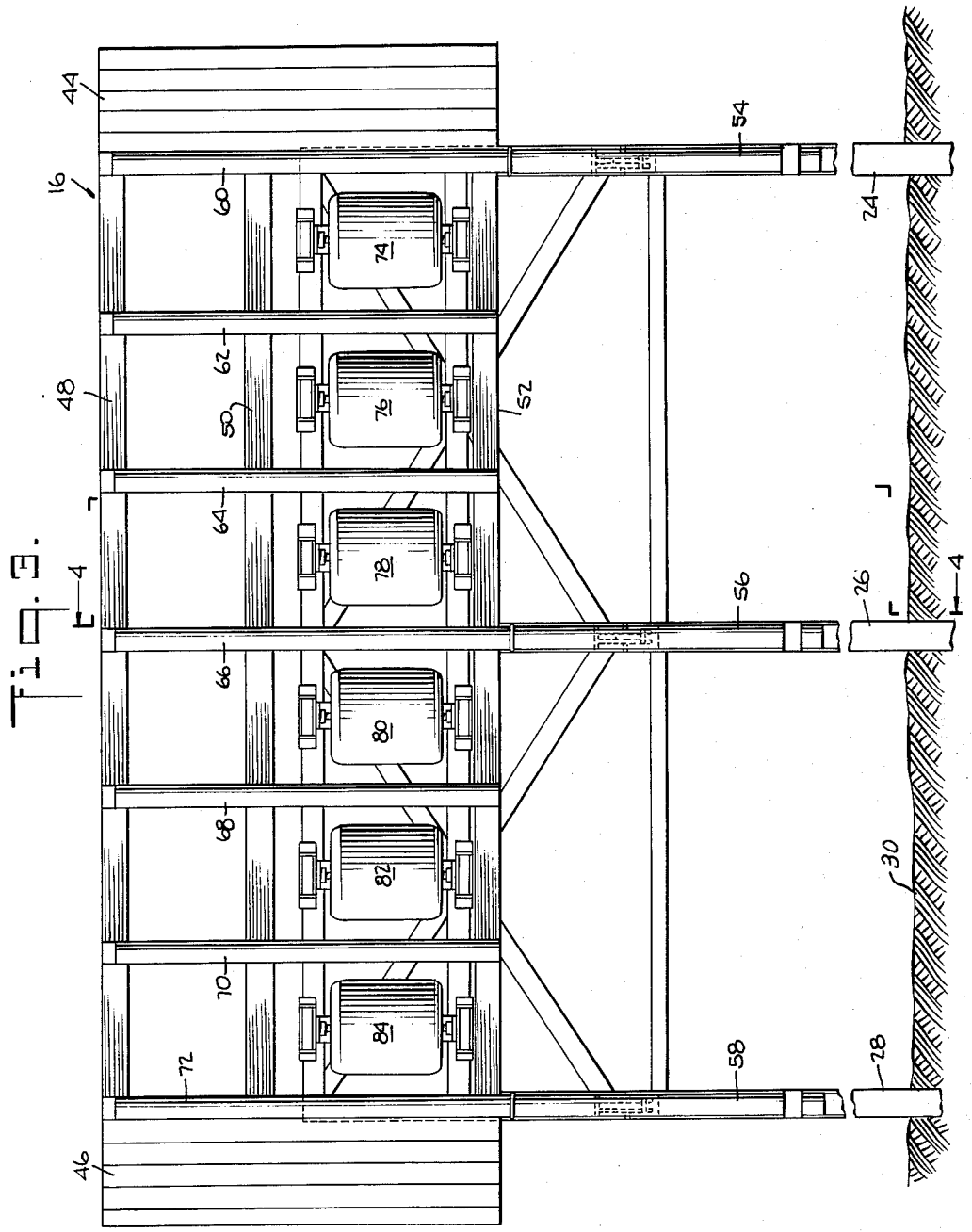

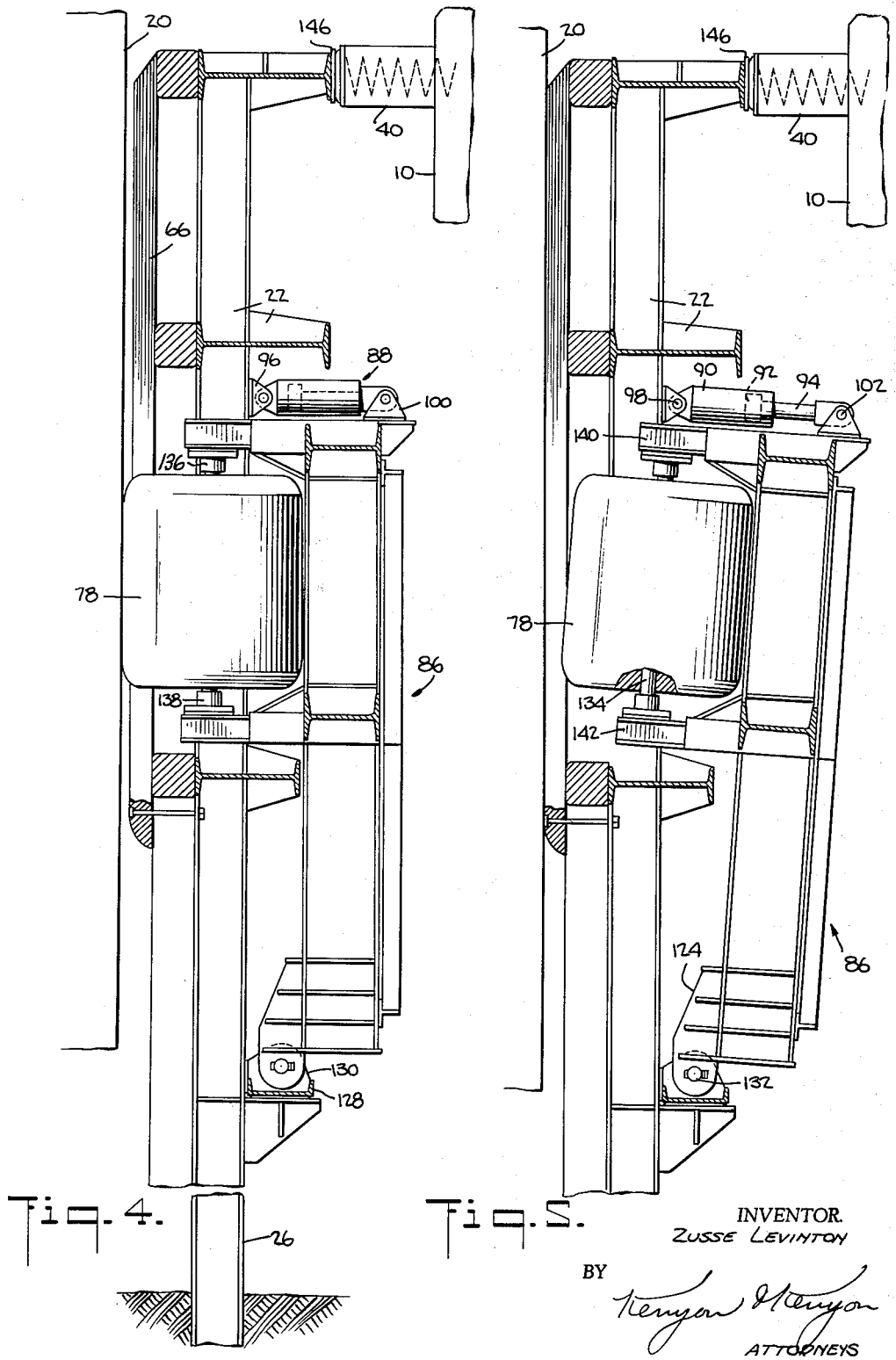

June 7, 1966  Z. LEVINTON  3,254,491
FENDER FOR MARINE PIERS
Filed Dec. 11, 1962  4 Sheets-Sheet 4
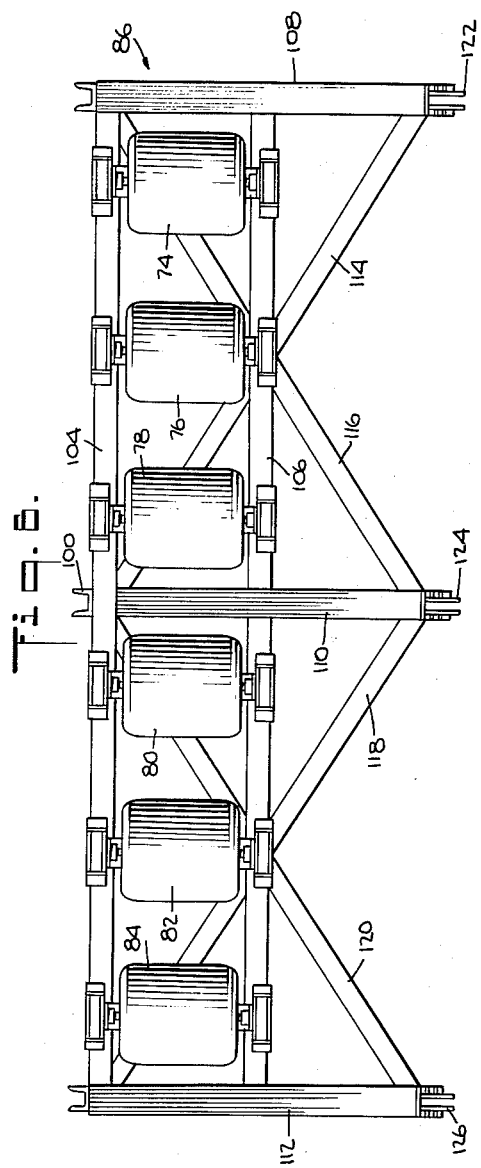
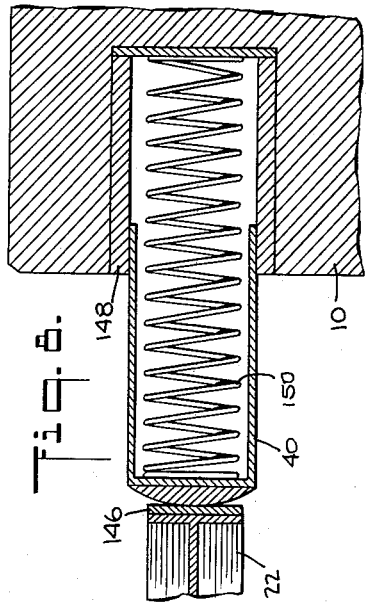
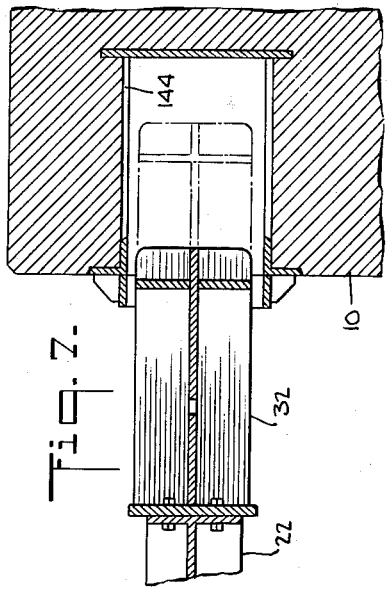
INVENTOR.
ZUSSE LEVINTON
BY
ATTORNEYS

United States Patent Office 3,254,491
Patented June 7, 1966

3,254,491
FENDER FOR MARINE PIERS
Zusse Levinton, New York, N.Y., assignor to Tippetts-Abbett-McCarthy-Stratton, New York, N.Y., a partnership
Filed Dec. 11, 1962, Ser. No. 243,882
7 Claims. (Cl. 61—48)

This invention relates to a fender for marine piers. In relates particularly to a fender which is resiliently supported to have energy absorbing and shock reducing capacity. It relates more particularly to a fender which is characterized by at least one roller element to facilitate the movement of a marine vessel along the fender and correspondingly along the pier or wharf with which the fender is associated. It relates still more particularly to a fender characterized by at least one roller element which is so mounted as to be retractable within and at least partly extendable beyond the working or ship-contacting face of the fender.

A known type of fender for marine piers is one which is supported at least semi-independently and resiliently with respect to the pier or wharf with which it is associated. This fender may take the form of a basic fender structure such as a metal framework of horizontal members known as wales and vertical members, some or all of these members being faced with wooden or composition bumper or rubbing elements, and the whole structure being at least somewhat offset to seaward from the side of the pier which it serves and supported in the attitude of an inverted pendulum by vertical beam or pile elements extending down through the water to a solid footing on and in subaquatic and subterranean earth strata. Sliding or non-rigid connection is made between the fender structure and the pier by means of horizontal guide and spring-loaded buffer assemblies.

When a marine vessel such as an oil tanker is brought in to a pier served by one or more fenders of the kind just described and strikes against the fender or fenders, there will be yielding or flexing of the fender-supporting vertical beams or piles and deflection or compression of the spring-loaded buffer elements as each basic fender structure is displaced forcefully toward the pier. In the course of this displacement, however, the kinetic energy of the vessel will be absorbed by the gradually increasing application of force to the pier through the resilient buffer assemblies, and also through the gradual stressing of the fender-supporting piles assuming that they experience at least some yielding as cantilevers, rather than all being absorbed by the pier in a shock or impact mode.

After the inward motion of the vessel toward the pier has been stopped in the manner indicated, the flexed fender-supporting piles and the compressed buffer assemblies will tend to restore themselves to their original or unflexed and uncompressed attitudes, and in so doing move each basic fender structure and the marine vessel bearing against it back out a little ways from the pier. Before and during this time, however, there will have been opportunity to secure the vessel to the pier by means of mooring lines or hawsers.

Once the vessel has been brought fully under control with respect to the pier by means of mooring lines extending from the vessel to the pier and mooring winches situated on either the vessel or the pier or both, some movement of the vessel may still be necessary for proper alignment of various structures or facilities on the vessel with corresponding or related structures or facilities on the pier. For example, in the case of an oil tanker, the vessel may have to be shifted slightly forward or aft to bring its cargo oil manifold connections into proper alignment with hose connections on the pier or the outer connecting ends of loading arms mounted on the pier.

If the vessel be shifted forward or aft either by selective slacking and tensioning of its mooring lines or by the urging of tug boats while it, the vessel, is in sliding contact with the rubbing or bumper elements of the basic fender structure, or indeed with rubbing or bumper elements affixed directly to the pier where there is no separately defined fender structure as hereinbefore described, these elements may be subject to at least some damage in shear as the vessel is dragged or pushed along them. Additionally there is the possibility of at least some minor damage to the vessel itself such as scrapping off of paint and scoring of side planting.

It is an object of this invention to provide a fender for marine piers in the course of use of which the foregoing difficulties are substantially eliminated by having the fender structure include roller elements against which a vessel can bear as it is moved along the pier.

It is another object of this invention to have the aforementioned roller elements forming part of the overall structure of a fender for marine piers, or of a pier itself, provided with a shiftable or movable mounting allowing the roller elements to be either fully retracted within the working face of the fender or pier or partly extended beyond it in a controlled manner as described.

In particular, and as pointed out in greater detail hereinafter, the present invention is useful in its application to a fender of the type hereinbefore described which is supported at least semi-independently with respect to the pier with which it is associated. As this invention is used with such a fender, a roller-carrying framework is provided in the rear of the basic fender structure, that is, between this structure and the pier, and is pivotably connected to the bottom portion of the basic fender structure or to the supporting beams or piles therefor at or near its, the roller-carrying framework's, lower end. At or near its upper end, the framework is connected to the basic fender structure by at least one operating mechanism such as a hydraulic or pneumatic piston and cylinder type operator which is capable of bringing the framework up close to the basic fender structure or causing or permitting it to swing back away from it.

The working face of the basic fender structure is left open in its regions between the conventional vertical and horizontal members which the structure comprises, and the several roller elements mounted on the roller-carrying framework are so disposed thereon that when this framework is brought up close, that is, swung up close to the basic fender structure, the roller elements carried by it have all around clearance with respect to the boundaries of the open regions of the structure to pass through these regions and extend at least part way beyond the rubbing or bumper elements affixed to the outer surfaces of the aforesaid mentioned vertical and horizontal members.

In the course of use of the present invention as a marine vessel approaches a pier served by at least one fender constructed according to this invention, the roller-carrying framework would normally be swung up close to the basic fender structure so that the roller elements extend at least partially beyond the rubbing or bumper elements of the structure. When the vessel strikes the fender, therefore, it will touch only the roller elements. After the vessel has been secured effectively by mooring lines or hawsers, it will be checked for proper positioning along the pier which the fender serves. Assuming the vessel be found to be somewhat out of its desired position, the roller-carrying framework facilitates the longitudinal movement of the vessel along the pier.

With the roller elements in their extended attitude, these rollers being oriented to rotate about substantially vertical axes, the vessel may be moved very easily along the fender without any damage to either the fender or itself. The method of effecting this movement, whether by use of the mooring lines, use of tug boats, or by any other means is assumed to be conventional and constitutes no part of the present invention. After the vessel has been positioned properly with respect to the pier, the roller-carrying framework may be and should be swung back so that its roller elements are fully retracted behind the rubbing elements of the fender. The vessel may now ride normally at its moorings and bear only against the fender rubbing or bumper elements.

The nature and substance of this invention as well as its objects and advantages will be more clearly perceived and fully understood by referring to the following description and claims taken in connection with the accompanying drawings in which:

FIG. 1 represents a plan view of a marine pier equipped with a plurality of fenders according to the present invention, this pier having a marine vessel alongside which is bearing upon several of its fenders;

FIG. 2 represents an enlarged plan view of a fender according to this invention with its roller elements extended into working position beyond the ship-engaging face of the fender;

FIG. 3 represents a front elevation view of the fender of FIG. 2;

FIG. 4 represents an enlarged view in transverse sectional elevation through the fender of FIG. 3 taken along line 4—4 therein looking in the direction of the arrows;

FIG. 5 represents a view similar to FIG. 4, but showing the pivotable framework whereon the roller elements of the fender are immediately mounted in such position that the rollers are retracted behind the ship-engaging face of the fender;

FIG. 6 represents a front elevation view of the pivotable framework whereon the roller elements of the fender of this invention are immediately mounted;

FIG. 7 represents an enlarged view in longitudinal sectional elevation through the horizontal guide assembly associated with the fender and pier of FIG. 2 taken along line 7—7 therein looking in the direction of the arrows, and FIG. 8 represents an enlarged view in longitudinal sectional elevation through one of the spring loaded buffer assemblies associated with the fender and pier of FIG. 2 taken along line 8—8· therein looking in the direction of the arrows.

Referring now to the drawings in detail, especially FIG. 1 thereof, a portion of a marine pier 10 is provided with fenders 12, 14, 16 and 18 according to this invention. A marine vessel 20 alongside the pier is in contact with fenders 14, 16, and 18.

Referring next to FIGS. 2 and 3, fender 16 comprises a basic frame structure 22 preferably constructed of steel beams as shown, which is of generally rectangular shape as viewed from seaward looking toward the side of the pier with its principal frame members running vertically and horizontally. Frame structure 22 is supported independently of pier 10 by vertical beams or piles 24, 26, and 28 extending downwardly to firm footings in subterranean and subaqueous strata 30, these piles being extensions of certain of the principal frame elements of structure 22.

Vertical beams or piles 24, 26, and 28 act as cantilevers, and frame structure 22 taken together with these vertical beams has the aspect of an inverted pendulum capable of some movement toward and away from the pier. Lateral alignment with respect to pier 10 of frame structure 22 in the course of the structure's in and out movements is maintained by horizontal guide element 32 which extends rearwardly from the basic frame structure into the pier with which it is slidably engaged. Outward movement of frame structure 22 is limited by snubber chains 34 and 36 each of which extends to structure 22 from an anchoring point on the pier. Inward movement of the frame structure is limited by buffer elements 38, 40, and 42 which extend outwardly from within pier 10 with which they are slidably engaged, and bear against frame structure 22 under spring loading.

The end portions of the front of outer faces of the horizontal members or wales of frame structure 22 are angled back somewhat with respect to the middle or main portions of these faces, and these end portions are covered by a plurality of vertical timbers such as 44 and 46 set in solid or continuous arrays. In their middle portions, the horizontal structural elements are faced individually with timbers 48, 50, and 52 which run substantially continuously.

For portions of their extents below frame structure 22, vertical beams 24, 26 and 28 are faced respectively with timbers 54, 56, and 58. Neither the upward extensions of beams 24, 26 and 28, however, nor any other vertical members of basic frame structure 22 in their extents between the horizontal members have any facing material directly in contact with them. It is to be understood, however, that the upward extensions of beams 24, 26 and 28 could be faced with timbers if desired. Secured across horizontal timbers 48, 50, and 52, however, and parallel to and in lateral alignment with the vertical structural members are timbers 60, 62, 64, 66, 68, 70 and 72. As these vertical timbers extend outwardly beyond the horizontal timbers, and with the hereinafter-described roller elements of the fender of this invention in retracted position, vertical timbers 60, 62, etc. absorb substantially all of the wear caused by a moored ship.

As ship 20 appears in contact with fender 16 in FIG. 2, it is not bearing against vertical rubbing elements 60, 62, etc. but instead is touching roller elements 74, 76, 78, 80, 82, and 84 which hold it out from the vertical timbers by at least a perceptible distance. These rollers, mounted in a manner and by a means described hereinafter, are aligned more or less centrally with open regions in basic frame structure 22 defined between the structural members behind horizontal timbers 50 and 52 and vertical timbers 60, 62, 64, etc., and have all around clearance with respect to the boundaries of these regions, as shown in FIG. 3.

Referring next to FIGS. 4, 5, and 6, a framework 86 on which roller elements 74, 76, 78, etc., are mounted or carried is pivotally connected at its lower end to vertical beams 24, 26, and 28 which support basic frame structure 22, and is located adjacent the side of the basic fender structure nearer to pier 10. Said in other words, roller-carrying framework 86 is located between basic frame structure 22 and the pier.

At its upper end, roller-carrying framework 86 is connected to the basic frame structure by three hydraulic operators which are pivotably joined to both the roller-carrying framework and the upward extensions of beams or piles 24, 26, and 28 which constitute vertical members of basic frame structure 22. A representative operator 88 shown in FIGS. 4 and 5 comprises a cylinder 90, a piston 92, and a piston rod 94. At its head end, cylinder 90 is rotatably connected to a pad 96 on the upward extension of beam 26 by means of a pivot pin 98. At its output end, piston rod 94 is rotatably connected to a pad 100 on the upper end of framework 86 by means of a pivot pin 102. The hose or piping connections to the hydraulic operators, and the pumps, filter, valves, and other control means associated therewith are considered to be conventional in keeping with the intended function of the operators, and accordingly are not illustrated.

As shown in FIG. 6, roller-carrying framework 86 comprises horizontal members 104 and 106; vertical members 108, 110, and 112, and cross bracing members 114, 116, 118, and 120. At their lower ends, the vertical members are provided respectively with downwardly extending bifurcations 122, 124, and 126. These bifurcations enclose and have a turning engagement on and with respect to upwardly extending pads mounted on a horizontal channel element 128 supported on brackets on the rear faces of vertical beams or piles 24, 26, and 28. This channel element is shown in FIGS. 4 and 5, and so is the engagement of bifurcations 124 with pad 130, by means of pivot pin 132.

Roller elements 74, 76, 78, etc., may be made of wood, hard or semi-hard rubber of natural or synthetic kind, or semi-hard plastic. Indeed they may be of any composition or material, and constructed in any way or by any process such that as manufactured and installed they have generally non-abrasive outer or working surfaces which may have some capacity for flattening locally under high loading, but do not deform or crush with undue ease. Each roller element is provided with a through-going, axially located vertical shaft, the ends of which project beyond the substantially flat upper and lower surfaces of the roller element and enter suitable bearings or bearing assemblies mounted on framework 86. Considering roller element 78 in FIGS. 4 and 5, for example, it has a vertical shaft 134 which enters and is supported on and guided by upper and lower bearings 136 and 138 of any suitable kind which are respectively attached to bracket structures 140 and 142 extending forwardly from horizontal members 104 and 106 of framework 86.

In the condition of apparatus shown in FIG. 4, hydraulic operator 88 has been actuated in such a manner that piston 92 has been moved all the way up to the head end of cylinder 90. Accordingly, piston rod 94 has pulled roller-carrying framework 86 up as close to the rear face of basic frame structure 22 as possible, framework 86 having been rotated forwardly on pivot pin 132 and also on the pins passing through bifurcations 122 and 126. It may be assumed, of course, that the other hydraulic operators besides operator 88 which are not shown have been actuated similarly so that their piston rods also have exerted an upward or forward pull on framework 86. What is to be noted especially in FIG. 4 is that with framework 86 being all the way forward at least a portion of roller element 78 extends beyond vertical timber 66 on basic frame structure 22 to hold off marine vessel 20 a little way from this timber. At the same time, of course, all of the other roller elements 74, 76, 80, 82, and 84 together with roller element 78 extend beyond the face line or face plane of vertical timbers 60, 62, 64, 68, 70, and 72, and similarly serve to hold the marine vessel somewhat away from these rubbing or bumper elements.

In the condition of apparatus shown in FIG. 5, all hydraulic operators have been so actuated that in the case of operator 88, for example, piston 92 has been moved all the way back to the tail end of cylinder 90 with corresponding extension of piston rod 94 to swing roller-carrying framework 86 back away from basic frame structure 22. What is to be noted especially in FIG. 5 is that with framework 86 being all the way to the rear, the entirety of roller element 78 and indeed that of each and every roller element is withdrawn behind the face line or face plane of vertical timbers 60, 62, 64, etc. Accordingly, marine vessel 20 may come into contact with these rubbing or bumper elements, and it is shown to be in contact with them.

Referring next to FIGS. 2 and 7, horizontal guide element 32 is bolted to the rear flange of the top horizontal member or top wale of basic frame structure 22, and extends rearwardly from this structure into a guide box 144 set within pier 10. The guide element has a farily loose sliding fit within box 144, and the box is sufficiently deep that guide element 32 can have free inward motion with respect to it for at least a fairly large inward displacement of basic frame structure 22 on piles 24, 26, and 28 as a marine vessel such as vessel 10 comes against fender 16. In broken outline, the guide element is shown in what is about its innermost position within the guide box consistent with other general proportions of the fender system illustrated. Of course, as illustrated, there is some initial extension of guide element 32 into guide box 144 when fender 16 is as far out from pier 10 as chains 34 and 36 permit it to be.

Referring finally to FIGS. 2, 4, 5 and 8, three reinforcing pads or plates of which pad 146 is exemplary are welded to the rear flange of the top horizontal member of basic frame structure 22. These pads are borne upon by the rounded forward ends of buffer elements 38, 40, and 42. Considering buffer element 40 and its installation as shown in FIG. 8 to be exemplary, this element is hollow for substantially its whole length, and is open at its rear or inner end. It has a close sliding fit within spring box 148 set within pier 10. Abutted at one end against the base of box 148 and at the other end against the inner surface of the forward end closure of buffer element 40 is a buffer spring 150 which works in compression.

Spring box 148 is sufficiently deep that buffer element 40 can have inward motion with respect to it against the force of spring 150 for at least a fairly large displacement of fender 16 or frame structure 22 thereof toward the pier. Desirably this motion and displacement are obtainable without spring 150 going solid. Of course, as illustrated, there is some initial extension of buffer element 40 into spring box 148 when fender 16 is as far out from pier 10 as chains 34 and 36 permit it to be. Spring 150 and the corresponding springs working against buffer elements 38 and 42 should be of sufficient length and stiffness to keep fender 16 pressed away from the pier to maintain at least some tension in chains 34 and 36 whenever there is no marine vessel bearing heavily against the seaward side of the fender.

A marine vessel such as vessel 20 will normally come alongside fenders 12, 14, 16, and 18 when their roller-carrying frameworks such as framework 86 are extended according to the showing in FIG. 4. Vessel 20 will make its initial contact with these fenders by coming against roller elements 74, 76, etc., and the vessel will be substantially secured to the pier. Thereafter, assuming that it is desired to shift vessel 20 in position along pier 10, the vessel 20 may be easily moved along the fenders while still in contact with them to any desired position as the roller elements are turned easily about their vertical axes. This is in marked contrast to the vessel having to scrape along fixed rubbing elements of fenders or a pier not equipped with the shiftable roller elements of this invention, or to be allowed to move back out of contact with the fenders or pier altogether with some attendant and undesirable loss of control.

It is to be appreciated that the specific embodiment described above is intended to be merely illustrative of the present invention, and that variations may be made by one skilled in the art without departing from the spirit and scope of this invention.

What is claimed is:

1. A fender for a marine pier comprising a fender base structure located to the seaward of said pier and spaced therefrom, said fender base structure having a ship-engaging face oriented to the seaward and a rear face oriented toward said pier, said fender base structure being supported on a subaqueous footing, buffer means disposed between said pier and said fender base structure for limiting movement of said fender base structure toward said pier, means connected between said fender base structure and said pier for controlling the alignment of said fender base structure with respect to said pier, ship positioning means pivotally connected to said fender base structure, said ship positioning means including at least one movable surface extending to the seaward of said ship-engaging face of said fender base structure and being capable of sustaining motion in a horizontal direction parallel to said ship-engaging face, and means for retracting said ship positioning means to a retracted position in which said movable surface is located between said ship engaging face and said pier.

2. The fender of claim 1, in which said fender base structure is connected to a plurality of pile members providing subaqueous support.

3. A fender for a marine pier comprising a fender base structure located to the seaward of said pier and spaced therefrom, said fender base structure being supported on a subaqueous footing and having a ship-engaging face oriented seaward and a rear face oriented toward said pier, said fender base structure being provided with a plurality of openings extending therethrough, ship positioning means pivotally connected to said fender base structure, said ship positioning means including a plurality of surfaces extending to the seaward of said ship-engaging face and being rotatable about substantially vertical axes so that at least a portion of each of said surfaces are capable of motion in a horizontal direction parallel to said ship-engaging face, and means for pivoting said ship positioning means to a retracted position in which said surfaces are located between said ship-engaging face and said pier, said surfaces passing through said openings in said fender base structure when said ship positioning means pivots between said working position and said retracted position.

4. The fender of claim 3 in which buffer means are disposed between said pier and said fender base structure for limiting movement of said fender base structure toward said pier, in which aligning means are connected between said fender base structure and said pier for controlling the alignment of said fender base structure with respect to said pier, and in which said plurality of surfaces comprise a plurality of roller elements rotatable about respective substantially vertical axes.

5. A fender for a marine pier comprising a fender base structure located to the seaward of said pier and spaced therefrom, said fender base structure having a ship-engaging face oriented seaward and a rear face oriented toward said pier, said fender base structure being supported by a plurality of pile members providing subaqueous support, ship positioning means comprising a framework having an upper end and a lower end, said lower end being pivotally connected to said pile members, operating means connecting said upper end to the rear face of said fender base structure for reciprocal movement with respect to said fender base structure whereby movement of said upper end toward said fender base structure locates said ship positioning means in a working position, and movement of said upper end away from said fender base structure locates said ship positioning means in a retracted position, a plurality of roller elements connected to said framework and horizontally spaced one from another, said roller elements being rotatable about respective substantially vertical axes, said fender base structure being provided with a plurality of openings extending therethrough and being located in registry with said roller elements whereby movement of ship positioning means to said working position results in the passage of said roller elements through said openings in said fender base structure so that at least a portion of the surfaces of said roller elements extend to the seaward of said ship engaging face of said fender base structure, and movement of said ship positioning means to said retracted position results in moving said roller elements through said openings so that the surfaces of said roller elements are located between said ship-engaging face and said pier.

6. The fender of claim 5 in which said operating means comprise a hydraulic cylinder and piston.

7. A fender for a marine pier comprising a fender base structure located to the seaward of said pier and spaced therefrom, said fender base structure having a ship engaging face oriented seaward and a rear face oriented toward said pier, said fender base structure being supported by a plurality of pile members providing subaqueous support, buffer means disposed between said pier and said fender base structure for limiting movement of said fender base structure toward said pier, means connected between said fender base structure and said pier for controlling the alignment of said fender base structure with respect to said pier, ship positioning means comprising a framework having an upper end and a lower end, said lower end being pivotally connected to said pile members and said upper end being connected to the rear face of said fender base structure, operating means for moving the upper end of said framework reciprocally with respect to said fender base structure whereby movement of said upper end toward said fender base structure locates said ship positioning means in a working position, and movement of said upper end away from said fender base structure locates said ship positioning means in a retracted position, a plurality of roller elements connected to said framework and horizontally spaced one from another, said roller elements being rotatable about respective substantially vertical axes, said fender base structure being provided with a plurality of openings extending therethrough and being located in registry with said roller elements whereby movement of ship positioning means to said working position results in the passage of said roller elements through said openings in said fender base structure so that at least a portion of the surfaces of said roller elements extend to the seaward of said ship-engaging face of said fender base structure, and movement of said ship positioning means to said retracted position results in moving said roller elements through said openings so that the surfaces of said roller elements are located between said ship-engaging face and said pier.

References Cited by the Examiner

UNITED STATES PATENTS

| 18,683 | 11/1857 | Day | 61—48 |
| 192,171 | 6/1877 | Johnson | 61—48 |
| 646,553 | 4/1900 | Holmes | 61—48 |
| 1,013,584 | 1/1912 | Brunnier | 61—48 |
| 1,414,620 | 5/1922 | Brownlee | 61—48 X |
| 2,722,906 | 11/1955 | Tweddell | 61—48 X |
| 2,952,979 | 9/1960 | Rolando | 61—48 |

FOREIGN PATENTS

| 659,687 | 10/1951 | Great Britain. |
| 758,566 | 10/1956 | Great Britain. |

OTHER REFERENCES

German application 1,088,432 printed September 1, 1960, K184a 5/01.

JACOB L. NACKENOFF, *Primary Examiner.*

EARL J. WITMER, CHARLES E. O'CONNELL,
*Examiners.*

R. A. STENZEL, *Assistant Examiner.*